(12) United States Patent
Safarzdeh-Amiri et al.

(10) Patent No.: US 10,131,557 B2
(45) Date of Patent: Nov. 20, 2018

(54) PROCESS FOR TREATMENT OF A FLUID COMPRISING AN OXIDIZABLE CONTAINMENT

(71) Applicant: TROJAN TECHNOLOGIES, London (CA)

(72) Inventors: Ali Safarzdeh-Amiri, Oakville (CA); John R. Walton, Colfax, CA (US); Michael Fagan, Blairstown, NJ (US)

(73) Assignee: TROJAN TECHNOLOGIES, London, ON (CA)

( * ) Notice: Subject to any disclaimer, the term of this patent is extended or adjusted under 35 U.S.C. 154(b) by 328 days.

(21) Appl. No.: 14/913,553

(22) PCT Filed: Aug. 21, 2014

(86) PCT No.: PCT/CA2014/000638
§ 371 (c)(1),
(2) Date: Feb. 22, 2016

(87) PCT Pub. No.: WO2015/024106
PCT Pub. Date: Feb. 26, 2015

(65) Prior Publication Data
US 2016/0200605 A1    Jul. 14, 2016

Related U.S. Application Data

(60) Provisional application No. 61/868,848, filed on Aug. 22, 2013.

(51) Int. Cl.
*C02F 1/68*    (2006.01)
*C02F 1/72*    (2006.01)
(Continued)

(52) U.S. Cl.
CPC ............... *C02F 1/725* (2013.01); *A62D 3/38* (2013.01); *A62D 2101/02* (2013.01);
(Continued)

(58) Field of Classification Search
CPC .. A62D 3/38; A62D 2101/02; A62D 2101/04; A62D 2101/20; A62D 2101/22;
(Continued)

(56) References Cited

U.S. PATENT DOCUMENTS 6,160,194 A    12/2000  Pignatello
6,960,330 B1    1/2005  Cox, Jr.
(Continued)

OTHER PUBLICATIONS

Fukushima, M. et al., Degradation Pathways of Pentachlorophenol by Photo-Fenton Systems in the Presence of Iron ( I II), Humic Acid, and Hydrogen Peroxide, Environmental Science and Technology, 35(9), Mar. 23, 2001, pp. 1771-1778.
(Continued)

*Primary Examiner* — Lucas A Stelling
(74) *Attorney, Agent, or Firm* — McAndrews, Held & Malloy, LTD.

(57) ABSTRACT

There is described a process for treatment of a fluid comprising an oxidizable contaminant. The process comprises the step of contacting the wastewater with a combination of: (i) a sulfide, (ii) a complex of Fe(III) and a chelating agent, and (iii) an oxidant. It has been discovered that of treatment of a fluid containing an oxidizable contaminant employing iron(III)-chelates as the Fenton catalyst may be significantly improved by including a sulfide in the reaction scheme. As described herein, by employing sulfide ion, the present inventors have been able to: (i) increase the rate of iron recycling from minutes or hours to a few seconds, and (ii) destroy benzene in an oil and gas refinery (OGR) wastewater in less than one minute. It is believed that these findings in OGR wastewater can be extended to other fluids containing other oxidizable contaminants.

20 Claims, 2 Drawing Sheets

(51) Int. Cl.
    *A62D 3/38*     (2007.01)
    *C02F 101/32*     (2006.01)
    *C02F 103/36*     (2006.01)
    *A62D 101/02*     (2007.01)
    *A62D 101/04*     (2007.01)
    *A62D 101/20*     (2007.01)
    *A62D 101/22*     (2007.01)
    *C02F 101/10*     (2006.01)
    *C02F 103/42*     (2006.01)

(52) U.S. Cl.
    CPC ...... *A62D 2101/04* (2013.01); *A62D 2101/20* (2013.01); *A62D 2101/22* (2013.01); *C02F 1/683* (2013.01); *C02F 1/722* (2013.01); *C02F 2101/10* (2013.01); *C02F 2101/32* (2013.01); *C02F 2101/322* (2013.01); *C02F 2103/365* (2013.01); *C02F 2103/42* (2013.01); *C02F 2305/023* (2013.01); *C02F 2305/026* (2013.01)

(58) Field of Classification Search
    CPC .......... C02F 1/682; C02F 1/722; C02F 1/725; C02F 2101/10; C02F 2101/32; C02F 2101/322; C02F 2103/365; C02F 2103/42; C02F 2305/023; C02F 2305/026
    See application file for complete search history.

(56) References Cited

U.S. PATENT DOCUMENTS

| | | |
|---|---|---|
| 7,662,294 B1 | 2/2010 | Cox, Jr. |
| 7,745,680 B1 | 6/2010 | Cox, Jr. |
| 8,609,926 B1 * | 12/2013 | Cox, Jr. ................. C02F 1/725 |
| | | 423/244.01 |

OTHER PUBLICATIONS

International Search Report corresponding to International Patent Application No. PCT/CA2014/000638, dated Dec. 29, 2014.
Office Action, dated Feb. 23, 2017, in Canadian Application No. 2,922,047, "Process for Treatment of a Fluid Comprising an Oxidizable Contaminant."

* cited by examiner

PROCESS FOR TREATMENT OF A FLUID COMPRISING AN OXIDIZABLE CONTAINMENT

CROSS-REFERENCE TO RELATED APPLICATION

The present application is a National Phase Entry of PCT International Application No. PCT/CA2014/000638, which was filed on Aug. 21, 2014, and claims the benefit under 35 U.S.C. § 119(e) of provisional patent application Ser. No. 61/868,848, filed Aug. 22, 2013, the contents of which are hereby incorporated by reference.

BACKGROUND OF THE INVENTION

Field of the Invention

In one of its aspects, the present invention relates to a process for treatment of a fluid comprising an oxidizable contaminant. In another of its aspects, the present invention relates to a process for treatment of a petroleum refinery wastewater comprising an oxidizable contaminant and a sulfide.

Description of the Prior Art

It is generally known that contaminants, such as organic pollutants, present in industrial wastewater and contaminated groundwater can be oxidized and destroyed by hydroxyl radicals (.OH).

Generally, this hydroxyl radical can be produced by a variety conventional processes, including:

UV irradiation of hydrogen peroxide (Baxendale, J. H. and Wilson, J. A. (1957). The photolysis of hydrogen peroxide at high light intensities Trans. Faraday Soc. 53, 344-356).

The so-called Fenton reaction, in which ferrous (Fe(II)) (Walling, C. (1970). Fenton's reagent revisited, Acc. Chem. Res. 8, 125-131) or ferric (Fe(III)) (Pignatello, J. J. (1992). Dark and photoassisted $Fe^{3+}$-catalyzed degradation of chlorophenoxy herbicides by hydrogen peroxide, Environ. Sci. Technol. 26, 944-951) ion react with hydrogen peroxide to produce hydroxyl radicals.

The photo-assisted Fenton process, in which a mixture of ferric ion (Sun, Y., and Pignatello, J. J. (1992), Chemical treatment of pesticides wastes. Evaluation of Fe(III) chelates for catalytic hydrogen peroxide oxidation of 2,4-D at circumeutral pH, J. Agric. Feed Chem. 40, 322-327) or an iron(III)-chelate (Zepp, R. G.; Faust, B. C., and Hoigne, J. (1992), Hydroxyl Radical Formation in Aqueous Reactions (pH 3-8) of Iron(II) with Hydrogen Peroxide: The Photo-Fenton Reaction, Environ. Sci. Technol. 26, 313-319) and hydrogen peroxide is irradiated with UV and/or UV/vis. light, etc.

The major drawbacks of these conventional approaches include: (i) for practical purposes, UV irradiation of hydrogen peroxide is limited to water with relatively high UV transmission and low level of contamination, and (i) for practical purposes, the Fenton and photo-assisted Fenton processes require a relatively acidic environment (e.g., pH 2-4) due to the iron solubility issue.

Sun and Pignatello (ibid) have shown that Fe(III) forms soluble complexes with a variety of organic and inorganic compounds at pH 6.0 in aqueous solution and that some of iron(III)-chelates can act as the Fenton reagent and can be used for the oxidation of 2,4-dichlorophenoxy acetic acid. The most active ligands were rodizonic acid, gallic acid, hexaketocyclohexane, picolinic acid, N-(hydroythyl)ethylenediaminetriacetic acid and tetrahydroxy-1,4-quinone hydrate. All but one of these ligands are expensive and/or may not be highly stable or readily available.

Walling et al. (Walling, C., Kurtz, M., and Schugar, H. J. (1970). The iron(III)-ethylenediaminetetracaetic acid peroxide system, Inorg. Chem. 9, 931-937), Francis et al. (Francis, K. C., Cummins, D., and Oakes, J. (1985). Kinetics and structural investigations of [$Fe^{III}$(edta)]-[edta-ethylenediamine-tetra-actate(4-)] catalyzed decomposition of hydrogen peroxide, J. Chem. Soc. Dalton Trans., 493-501), Rahhal et al. (Rahal, S. and Richter, H. W. (1988). Reduction of hydrogen peroxide by the ferrous iron chelate of diethylenetetradiamine-N,N,N',N'',N''-pentaacetate, J. Am. Chem. Soc. 110, 3126-3133, Sun and Pignatello (ibid), U.S. Pat. No. 6,960,330 (Cox), Dao et al. (Dao, Y. H., and De Laat, J. (2011). Hydroxyl radical involvement in the decomposition of hydrogen peroxide by ferrous and ferric-nitrilotriacetate complexes at neutral pH, Wat. Res. 45, 3309-3311) and others (for a review see Pignatello, J. J., Oliverous, E., and MacKay, A. (2006). Advanced oxidation processes for organic contaminant destruction based on the Fenton Reaction and related chemistry, Critical Rev Environ. Sci. Technol., 36, 1-84.) have shown that iron(III)-chelates (also referred to herein as $Fe^{III}$-L) also act as the Fenton reagent and are able to decompose hydrogen peroxide in circumneutral pH conditions (pH 6.5-7.5) according to following reactions:

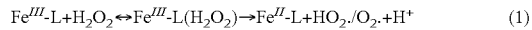

$$Fe^{III}\text{-}L + H_2O_2 \leftrightarrow Fe^{III}\text{-}L(H_2O_2) \rightarrow Fe^{II}\text{-}L + HO_2./O_2.^- + H^+ \quad (1)$$

$$Fe^{III}\text{-}L + HO_2./O_2.^- \rightarrow Fe^{II}\text{-}L + O_2 \quad (2)$$

$Fe^{II}$-L generated in the above reaction reacts with hydrogen peroxide and generates hydroxyl radical (.OH) according to the following reaction:

$$Fe^{II}\text{-}L + H_2O_2 \rightarrow Fe^{III}\text{-}L + OH^- + .OH \quad (3)$$

Hydroxyl radicals generated in reaction (3) can react with, and oxidize, organic pollutants in water and soil (Dao and De Laat (ibid), U.S. Pat. No. 6,960,330 (Cox, Jr.) and U.S. Pat. No. 6,160,194 (Pignatello)). The chelating agents that can be used include aminopolycarboxylates and their phosphorous-containing analogues, for example, ethylendiaminetetraacetic acid (EDTA), nitrilotriacetate (NTA), methyglicenediacetic acid (MGDA), phosponomethyliminodiacetic acid (PMIDA) and the like.

Unfortunately, the rate of generation of OH-radical from iron(III)-chelate catalyzed decomposition of hydrogen peroxide is very slow. For example, the rate constant of reaction between $Fe^{III}$-nitrilotriacetate, which is a relatively active iron(III)-chelate catalyst, and hydrogen peroxide varies from 16-27 $M^{-1}s^{-1}$ (De Laat, J., Dao, Y. H., El Najjar, N. H., and Daou, C. (2011). Effect of some parameters on the rate of the catalysed decomposition of hydrogen peroxide by iron(III)-nitrilotriacetate in water, Wat. Res. 45, 5654-5664), depending on solution pH. As a result, treatment of contaminated water employing iron(III)-chelates as the Fenton catalyst is time consuming and impractical for most industrial applications, in general, and for the oxidation of benzene and other aromatic hydrocarbons in oil and gas refinery (OGR) wastewater, in particular.

Thus, despite the advances to date, there is an ongoing need for an improved approach for treatment of contaminated water employing iron(III)-chelates as the Fenton catalyst for industrial applications, in general, and for the oxidation of benzene and other aromatic hydrocarbons in oil and gas refinery (OGR) wastewater, in particular.

SUMMARY OF THE INVENTION

It is an object of the present invention to obviate or mitigate at least one of the above-mentioned disadvantages of the prior art.

It is another object of the present invention to provide a novel process for treatment of a fluid comprising an oxidizable contaminant.

It is another object of the present invention to provide a novel process for treatment of a petroleum refinery wastewater comprising an oxidizable contaminant and a sulfide.

Accordingly, in one of its aspects, the present invention provides a process for treatment of a fluid comprising an oxidizable contaminant, the process comprising the step of contacting the wastewater with a combination of: (i) a sulfide, (ii) a complex of Fe(III) and a chelating agent, and (iii) an oxidant.

In another of its aspects, the present invention provides a process for treatment of a petroleum refinery wastewater comprising an oxidizable contaminant and a sulfide, the process comprising the step of contacting the wastewater with a combination of: (i) a complex of Fe(III) and a chelating agent, and (ii) hydrogen peroxide.

In yet another of its aspects, the present invention provides a process for treatment of a petroleum refinery wastewater comprising an oxidizable contaminant and a sulfide, the process comprising the steps of:

(a) adding a complex of Fe(III) and a chelating agent to the wastewater to cause the complex of Fe(III) and the chelating agent to react with the sulfide to produce a complex of Fe(II) and the chelating agent;

(b) adding hydrogen peroxide to the wastewater to cause the hydrogen peroxide to react with the complex of Fe(II) and the chelating agent to produce a hydroxyl radical; and (c) causing the hydroxyl radical to react with the oxidizable contaminant to reduce the concentration of the oxidizable contaminant in the wastewater.

Thus, the present inventors have discovered that of treatment of a fluid containing an oxidizable contaminant employing iron(III)-chelates as the Fenton catalyst may be significantly improved by including a sulfide in the reaction scheme. As will be developed below, by employing sulfide ion, the present inventors have been able to: (i) increase the rate of iron recycling from minutes or hours to a few seconds, and (ii) destroy benzene in an oil and gas refinery (OGR) wastewater in less than one minute. It is believed that these findings in OGR wastewater can be extended to other fluids containing other oxidizable contaminants.

While not wishing to be bound by any particular theory or mode of action, the inventors believe that the present process proceeds according to the following reaction scheme:

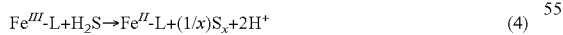  (4)

  (3)

This sequence of reactions proceeds relatively quickly and results in rapid concurrent formation of hydroxyl radical (.OH) and regeneration of Fe$^{III}$-L. The hydroxyl radical oxidizes and reduces the concentration of the oxidizable contaminant in the fluid.

In the context of OGR operations, iron(III)-chelates have been used for the oxidation and removal of hydrogen sulfide from gaseous streams employing a gas-liquid contactor (DeBarry, D. (1997). Chemical evolution of liquid redox processes, *Environ. Progress,* 16, 193-199). This sulfur recovery process is also known commercially as the Lo-Cat and SulFerox processes.

The overall stoichiometry for the oxidation of sulfide may be represented by the following equation:

  (4)

The process is catalytic in iron-chelate and in the commercial process, Fe$^{II}$-L generated in reaction (4) is converted to Fe$^{III}$-L through aeration according to the following reactions:

  (5)

  (6)

As can be seen, iron(III)-chelates employed in these processes undergo redox recycling. Therefore, oxidation of sulfide by iron(III)-chelates under circumneutral pH to elemental sulfur provides a fast, convenient, and economical method of generating iron(II).

This makes the present process particularly well suited for treatment of OGR wastewater—i.e., since sulfide is indigenous in OGR wastewater. However, it would be understood that the present process can be suitably adapted to treat other fluids, including fluids in which sulfide is not indigenous by added sulfide to the reaction scheme. Thus, the present process is not restricted to treatment of OGR wastewater.

In a preferred embodiment, the present process may be used, for example, to retrofit existing wastewater treatment operations or to enhance the performance of other treatment technologies.

The commercial potential of the present process is significant since, to the knowledge of the present inventors, there is no consistent way to employ the Fenton reaction at pH 6-8. The present process addresses that inconsistency by providing a solution that can be adapted to particular application. A particular applicant of the present process is the destruction of benzene in OGR wastewater. Other applications of the present process exist within the chemical processing industry.

The practical advantages of the present process over conventional Fenton catalytic processes include:
- the present process employs substantially less iron catalyst—this reduces chemical cost and reduces sludge production;
- the reaction underlying the present process appears to be more "aggressive" reaction in the sense of observing much shorter reaction times and/or very short hydraulic retention time—this means, the process can be applied on-line, with less operator manpower to achieve more efficient oxidant (e.g., H$_2$O$_2$) utilization; and
- the present process simplifies application of the Fenton process (e.g., typically, no pH adjustments to the treatment feed is required)

The present process has a number of applications.

One area of application includes industrial process waters and waste effluents (e.g, liquid, vapor and solids), including:
- oil refineries—stripped sour waters, spent caustic solutions, oil-water separators, and cooling water systems;
- oil and gas production—frack water treatment and re-use, product desulfurization, and well stimulation/permeability improvement; and
- chemical plants—toxicity reduction and/or biodegradability improvement of process wastes prior to biological treatment and/or discharge.

Another area of application of the present process relates to municipal leachates and wastewaters, including:

organic oxidation—WAS pretreatment prior to or during aerobic or anaerobic digestion; organic phosphorus digestion to affect ortho-phosphate removal; and inorganic oxidation—conversion of ferrous ion to ferric ion to affect chemically-enhanced primary treatment and solids dewatering.

Other areas of potential application of the present process include:

microbiocide for above applications, including biofilm control in piping circuits and storage reservoirs (continuous or intermittent shocking);

microbiocide for horticultural and agricultural soils, growth media, and irrigation circuits;

desulfurization of hydrocarbons derived from petroleum or biofeedstocks (e.g., crude sulfated turpentine and low-sulfur diesel fuels);

predigestion of biomass to affect the hydrolysis/solubilization of e.g., lignin, lignocellulose, or microbial cells (e.g., waste activated sludge or algae from biofuel operations) prior to fermentation or digestion; and digestion of organic materials to affect the separation of associated inorganic material(s)—e.g., breaking up organically-bound metal or mineral complexes such as metal chelates or sequestered phosphates.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
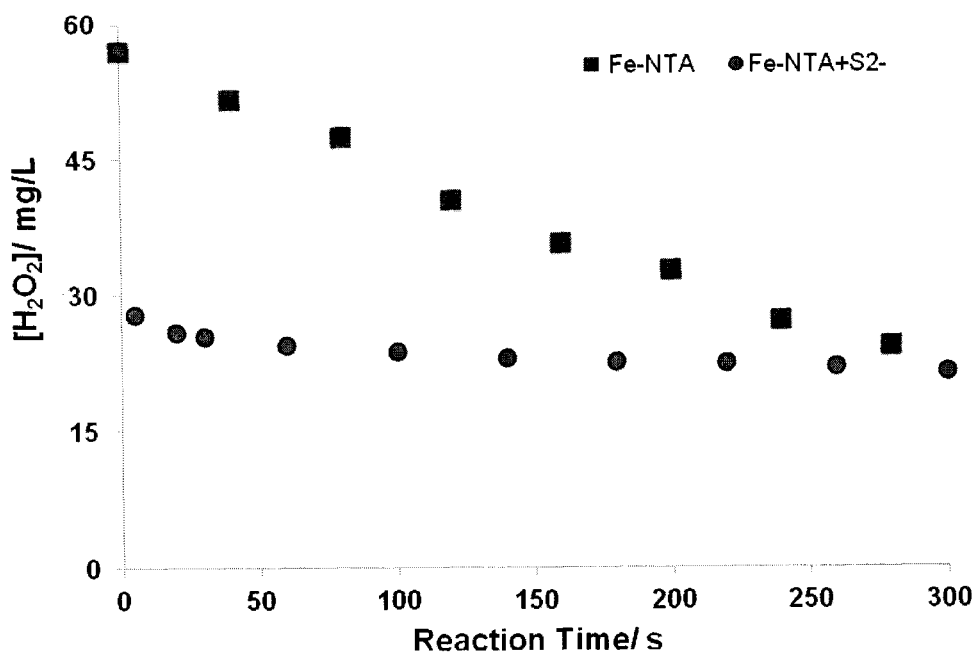
FIG. 1 illustrates the rate of catalytic decomposition of hydrogen peroxide by Fe(III)-NTA and $S^{2-}$/Fe(III)-NTA in Milli-Q water.

The present invention relates to a process for treatment of a fluid comprising an oxidizable contaminant, the process comprising the step of contacting the wastewater with a combination of: (i) a sulfide, (ii) a complex of Fe(III) and a chelating agent, and (iii) an oxidant. Preferred embodiments of this process may include any one or a combination of any two or more of any of the following features:

the contacting step is conducted at a pH in the range of from about 6.5 to about 10;

the chelating agent is a humic acid;

the chelating agent is an aminocarboxylic acids;

the chelating agent is selected from the group consisting of nitrilotriacetic acid (NTA), ethylenediamine-N,N'-tetraacetic acid (EDTA), diethylenetriamine-pentacetic acid (DTPA), ethylenediamine-N,N'-disuccinic acid (EDDS), iminodisuccinic acid (IDS), methylglycinediacetic (MGA), phosphonomethyl-iminodiacetic acid (PDA) and N-(2-carboxyethyl)iminodiacetic acid (CEDA);

the oxidizable contaminant is selected from the group consisting of an organic compound, an inorganic compound, a biological material and any mixture of two or more of these;

the oxidizable contaminant is selected from the group consisting of an organic compound having at least one aromatic functional group, an organic compound having at least one aliphatic functional group and any mixture of two or more of these;

the oxidizable contaminant is selected from the group consisting of gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; NDMA, haloalkenes (e.g., vinyl chloride, DCE, TCE, PCE), cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, energetic compounds (e.g., TNT, RDX, NDMA, etc.), a pharmaceutical (e.g., endocrine disruptors, estrogen, steroids, antibiotics, pain relievers, caffeine, etc.), a pesticide (including any compound used to deter and/or destroy pests, including herbicides, fungicides, insecticides, rodenticides, and the like, Atrazine, IPC, 2,4-D, DDT, N—N-diethyltoluamide, etc.), a plasticizer, a chelant, a fire retardant (e.g., tri (2-chloroethyl) phosphate), a disinfectant (e.g., triclosan), a detergent metabolite (e.g., 4-nonylphenol), a chloroethene, a petroleum hydrocarbons, a compound that contributes to biological oxygen demand, a compound that contributes to chemical oxygen demand, a polyfunctional oxygenated compound (such as diethers and hydroxyethers), an aliphatic alcohol, an ether, a ketone, an alkane, a naphthalene, a lubricant, a cyanide, a mercaptan and any mixture of two or more of these;

the oxidizable contaminant is selected from the group consisting of a polyaromatic hydrocarbon including alkyl and/or halogenated derivatives thereof, a monoaromatic hydrocarbon including alkyl and/or halogenated derivatives thereof, chlorinated ethylene, a napthenic acid, an amine, a thiol, a disulfide, a thioethers and any mixture of two or more of these;

the oxidizable contaminant is selected from the group consisting of phenol, benzene, toluene, ethylbenzene, xylene and any mixture of two or more of these;

the oxidizable contaminant is selected from the group consisting of a pest, a plant, an invertebrate, a mollusk, a nematode, an insect, a parasite, a mold, a fungi, a protozoa, an amoeba, a bacteria, a virus, a prion, a protein, an amino acid, smallpox, Ebola, cholera, typhoid, anthrax, plague, cryptosporidium and any mixture of two or more of these;

the fluid is a vapor;

the fluid is a liquid (e.g., a solution, a slurry, a colloidal suspension and the like);

the fluid is an aqueous liquid;

the fluid is selected from the group consisting of groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, spent ultra-pure water and any mixture of two or more of these;

the fluid is wastewater from a refinery;

the fluid is wastewater from a petroleum refinery;

the oxidant is selected from the group consisting of hydrogen peroxide, peroxymonosulfate, peroxydisulfate, peracetic acid and any mixture of two or more of these;

the oxidant is hydrogen peroxide;

the sulfide is selected from the group consisting of dissolved sulfide (HS—), methylsulfide, a mercaptan and any mixture of two or more of these;

the sulfide is dissolved sulfide (HS—);

the sulfide is present at a concentration in the range of about 1 mM to about 10 mM;

the sulfide is present at a concentration in the range of about 1 mM to about 5 mM;

the sulfide is present at a concentration in the range of about 1.5 mM to about 2.5 mM;

the oxidant is present at a concentration in the range of about 1 mM to about 10 mM;

the oxidant is present at a concentration in the range of about 1 mM to about 5 mM;

the oxidant is present at a concentration in the range of about 1.5 mM to about 2.5 mM;

the complex of Fe(III) and the chelating agent is present at a concentration in the range of about 0.01 mM to about 10 mM;

the complex of Fe(III) and the chelating agent is present at a concentration in the range of about 0.1 mM to about 2 mM;

the complex of Fe(III) and the chelating agent is present at a concentration in the range of about 0.4 mM to about 0.6 mM;

the contacting step is conducted for a period of up to about 15 minutes;

the contacting step is conducted for a period of from about 1 to about 15 minutes;

the contacting step is conducted for a period of from about 2 to about 5 minutes;

the contacting step is conducted at a temperature in the range of from about 0° to about 100° C.;

the contacting step is conducted at a temperature in the range of from about 0° to about 80° C.;

the contacting step is conducted at a temperature in the range of from about 0° to about 50° C.;

the sulfide is indigenous to the fluid, and the complex of Fe(III) and the chelating agent, and the oxidant are added to the fluid;

the complex of Fe(III) and the chelating agent, and the oxidant are added to the fluid concurrently the complex of Fe(III) and the chelating agent, and the oxidant are added to the fluid sequentially;

the complex of Fe(III) and the chelating agent is added to the fluid prior to addition of the oxidant;

the complex of Fe(III) and the chelating agent is added to the fluid after addition of the oxidant;

the complex of Fe(III) and the chelating agent is added to the fluid at a constant rate;

the complex of Fe(III) and the chelating agent is added to the fluid at a variable rate;

the complex of Fe(III) and the chelating agent is added to the fluid intermittently;

the oxidant is added to the fluid at a constant rate;

the oxidant is added to the fluid at a variable rate; and/or the oxidant is added to the fluid intermittently.

The present invention relates to a process for treatment of a petroleum refinery wastewater comprising an oxidizable contaminant and a sulfide, the process comprising the step of contacting the wastewater with a combination of: (i) a complex of Fe(III) and a chelating agent, and (ii) hydrogen peroxide. Preferred embodiments of this process may include any one or a combination of any two or more of any of the following features:

the contacting step is conducted at a pH in the range of from about 6.5 to about 7.5;

the chelating agent is a humic acid;

the chelating agent is an aminocarboxylic acids the chelating agent is selected from the group consisting of nitrilotriacetic acid (NTA), ethylenediamine-N,N'-tetraacetic acid (EDTA), diethylenetriamine-pentacetic acid (DTPA), ethylenediamine-N,N'-disuccinic acid (EDDS), iminodisuccinic acid (IDS), methylglycinediacetic (MGA), phosphonomethyl-iminodiacetic acid (PDA) and N-(2-carboxyethyl)iminodiacetic acid (CEDA).

the oxidizable contaminant is selected from the group consisting of an organic compound, an inorganic compound, a biological material and any mixture of two or more of these;

the oxidizable contaminant is selected from the group consisting of an organic compound having at least one aromatic functional group, an organic compound having at least one aliphatic functional group and any mixture of two or more of these;

the oxidizable contaminant is selected from the group consisting of gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; NDMA, haloalkenes (e.g., vinyl chloride, DCE, TCE, PCE), cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, energetic compounds (e.g., TNT, RDX, NDMA, etc.), a pharmaceutical (e.g., endocrine disruptors, estrogen, steroids, antibiotics, pain relievers, caffeine, etc.), a pesticide (including any compound used to deter and/or destroy pests, including herbicides, fungicides, insecticides, rodenticides, and the like, Atrazine, IPC, 2,4-D, DDT, N—N-diethyltoluamide, etc.), a plasticizer, a chelant, a fire retardant (e.g., tri (2-chloroethyl) phosphate), a disinfectant (e.g., triclosan), a detergent metabolite (e.g., 4-nonylphenol), a chloroethene, a petroleum hydrocarbons, a compound that contributes to biological oxygen demand, a compound that contributes to chemical oxygen demand, a polyfunctional oxygenated compound (such as diethers and hydroxyethers), an aliphatic alcohol, an ether, a ketone, an alkane, a naphthalene, a lubricant, a cyanide, a mercaptan and any mixture of two or more of these;

the oxidizable contaminant is selected from the group consisting of a polyaromatic hydrocarbon including alkyl and/or halogenated derivatives thereof, a monoaromatic hydrocarbon including alkyl and/or halogenated derivatives thereof, chlorinated ethylene, a napthenic acid, an amine, a thiol, a disulfide, a thioethers and any mixture of two or more of these;

the oxidizable contaminant is selected from the group consisting of phenol, benzene, toluene, ethylbenzene, xylene and any mixture of two or more of these;

the oxidizable contaminant is selected from the group consisting of a pest, a plant, an invertebrate, a mollusk, a nematode, an insect, a parasite, a mold, a fungi, a protozoa, an amoeba, a bacteria, a virus, a prion, a protein, an amino acid, smallpox, Ebola, cholera, typhoid, anthrax, plague, cryptosporidium and any mixture of two or more of these;

the sulfide is selected from the group consisting of dissolved sulfide (HS—), methylsulfide, a mercaptan and any mixture of two or more of these;

the sulfide is dissolved sulfide (HS—);

the sulfide is present at a concentration in the range of about 1 mM to about 10 mM;

the sulfide is present at a concentration in the range of about 1 mM to about 5 mM;

the sulfide is present at a concentration in the range of about 1.5 mM to about 2.5 mM;

the hydrogen peroxide is present at a concentration in the range of about 1 mM to about 10 mM;

the hydrogen peroxide is present at a concentration in the range of about 1 mM to about 5 mM;

the hydrogen peroxide is present at a concentration in the range of about 1.5 mM to about 2.5 mM;

the complex of Fe(III) and the chelating agent is present at a concentration in the range of about 0.01 mM to about 10 mM;

the complex of Fe(III) and the chelating agent is present at a concentration in the range of about 0.1 mM to about 2 mM;

the complex of Fe(III) and the chelating agent is present at a concentration in the range of about 0.4 mM to about 0.6 mM;

the contacting step is conducted for a period of up to about 15 minutes;

the contacting step is conducted for a period of from about 1 to about 15 minutes;

the contacting step is conducted for a period of from about 2 to about 5 minutes;

the contacting step is conducted at a temperature in the range of from about 0° to about 100° C.;

the contacting step is conducted at a temperature in the range of from about 0° to about 80° C.;

the contacting step is conducted at a temperature in the range of from about 0° to about 50° C.;

the complex of Fe(III) and the chelating agent, and the hydrogen peroxide are added to the wastewater concurrently;

the complex of Fe(III) and the chelating agent, and the hydrogen peroxide are added to the wastewater sequentially;

the complex of Fe(III) and the chelating agent is added to the wastewater prior to addition of the hydrogen peroxide;

the complex of Fe(III) and the chelating agent is added to the wastewater after addition of the hydrogen peroxide;

the complex of Fe(III) and the chelating agent is added to the wastewater at a constant rate;

the complex of Fe(III) and the chelating agent is added to the wastewater at a variable rate;

the complex of Fe(III) and the chelating agent is added to the wastewater intermittently;

the hydrogen peroxide is added to the wastewater at a constant rate;

the hydrogen peroxide is added to the wastewater at a variable rate; and/or the hydrogen peroxide is added to the wastewater intermittently.

The present invention relates to a process for treatment of a petroleum refinery wastewater comprising an oxidizable contaminant and a sulfide, the process comprising the steps of: (a) adding a complex of Fe(III) and a chelating agent to the wastewater to cause the complex of Fe(III) and the chelating agent to react with the sulfide to produce a complex of Fe(II) and the chelating agent; (b) adding hydrogen peroxide to the wastewater to cause the hydrogen peroxide to react with the complex of Fe(II) and the chelating agent to produce a hydroxyl radical; and (c) causing the hydroxyl radical to react with the oxidizable contaminant to reduce the concentration of the oxidizable contaminant in the wastewater. Preferred embodiments of this process may include any one or a combination of any two or more of any of the following features:

the contacting step is conducted at a pH in the range of from about 6.5 to about 10;

the chelating agent is a humic acid;

the chelating agent is an aminocarboxylic acids;

the chelating agent is selected from the group consisting of nitrilotriacetic acid (NTA), ethylenediamine-N,N'-tetraacetic acid (EDTA), diethylenetriamine-pentacetic acid (DTPA), ethylenediamine-N,N'-disuccinic acid (EDDS), iminodisuccinic acid (IDS), methylglycinediacetic (MGA), phosphonomethyl-iminodiacetic acid (PDA) and N-(2-carboxyethyl)iminodiacetic acid (CEDA);

the oxidizable contaminant is selected from the group consisting of an organic compound, an inorganic compound, a biological material and any mixture of two or more of these;

the oxidizable contaminant is selected from the group consisting of an organic compound having at least one aromatic functional group, an organic compound having at least one aliphatic functional group and any mixture of two or more of these;

the oxidizable contaminant is selected from the group consisting of gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; NDMA, haloalkenes, vinyl chloride, DCE, TCE, PCE, cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, energetic compounds (e.g., TNT, RDX, NDMA, etc.), a pharmaceutical (e.g., endocrine disruptors, estrogen, steroids, antibiotics, pain relievers, caffeine, etc.), a pesticide (including any compound used to deter and/or destroy pests, including herbicides, fungicides, insecticides, rodenticides, and the like, Atrazine, IPC, 2,4-D, DDT, N—N-diethyltoluamide, etc.), a plasticizer, a chelant, a fire retardant (e.g., tri (2-chloroethyl) phosphate), a disinfectant (e.g., triclosan), a detergent metabolite (e.g., 4-nonylphenol), a chloroethene, a petroleum hydrocarbons, a compound that contributes to biological oxygen demand, a compound that contributes to chemical oxygen demand, a polyfunctional oxygenated compound (such as diethers and hydroxyethers), an aliphatic alcohol, an ether, a ketone, an alkane, a naphthalene, a lubricant, a cyanide, a mercaptan and any mixture of two or more of these;

the oxidizable contaminant is selected from the group consisting of a polyaromatic hydrocarbon including alkyl and/or halogenated derivatives thereof, a monoaromatic hydrocarbon including alkyl and/or halogenated derivatives thereof, chlorinated ethylene, a napthenic acid, an amine, a thiol, a disulfide, a thioethers and any mixture of two or more of these;

the oxidizable contaminant is selected from the group consisting of phenol, benzene, toluene, ethylbenzene, xylene and any mixture of two or more of these;

the oxidizable contaminant is selected from the group consisting of a pest, a plant, an invertebrate, a mollusk, a nematode, an insect, a parasite, a mold, a fungi, a protozoa, an amoeba, a bacteria, a virus, a prion, a protein, an amino acid, smallpox, Ebola, cholera, typhoid, anthrax, plague, cryptosporidium and any mixture of two or more of these the sulfide is selected from the group consisting of dissolved sulfide (HS—), methylsulfide, a mercaptan and any mixture of two or more of these;

the sulfide is dissolved sulfide (HS—);

the sulfide is present at a concentration in the range of about 1 mM to about 10 mM;

the sulfide is present at a concentration in the range of about 1 mM to about 5 mM;

the sulfide is present at a concentration in the range of about 1.5 mM to about 2.5 mM;

the hydrogen peroxide is present at a concentration in the range of about 1 mM to about 10 mM;

the hydrogen peroxide is present at a concentration in the range of about 1 mM to about 5 mM;

the hydrogen peroxide is present at a concentration in the range of about 1.5 mM to about 2.5 mM;

the complex of Fe(III) and the chelating agent is present at a concentration in the range of about 0.01 mM to about 10 mM;

the complex of Fe(III) and the chelating agent is present at a concentration in the range of about 0.1 mM to about 2 mM;

the complex of Fe(III) and the chelating agent is present at a concentration in the range of about 0.4 mM to about 0.6 mM;

Steps (a)-(c) are conducted for a period of up to about 15 minutes

Steps (a)-(c) are conducted for a period of from about 1 to about 15 minutes;

Steps (a)-(c) are conducted for a period of from about 2 to about 5 minutes;

Steps (a)-(c) are conducted at a temperature in the range of from about 0° to about 100° C.;

the Steps (a)-(c) are conducted at a temperature in the range of from about 0° to about 80° C.;

the Steps (a)-(c) are is conducted at a temperature in the range of from about 0° to about 50° C.;

the complex of Fe(III) and the chelating agent, and the hydrogen peroxide are added to the wastewater concurrently;

the complex of Fe(III) and the chelating agent, and the hydrogen peroxide are added to the wastewater sequentially;

the complex of Fe(III) and the chelating agent is added to the wastewater prior to addition of the hydrogen peroxide;

the complex of Fe(III) and the chelating agent is added to the wastewater after addition of the hydrogen peroxide;

the complex of Fe(III) and the chelating agent is added to the wastewater at a constant rate;

the complex of Fe(III) and the chelating agent is added to the wastewater at a variable rate;

the complex of Fe(III) and the chelating agent is added to the wastewater intermittently;

the hydrogen peroxide is added to the wastewater at a constant rate;

the hydrogen peroxide is added to the wastewater at a variable rate; and/or the hydrogen peroxide is added to the wastewater intermittently.

The complex of iron(III) and the chelating agent has been used for the recovery of sulfur from sour gaseous streams. The oxidation of sulfide to elemental sulfur—as shown in reaction (4) above—is a fast, convenient, and useful source of ferrous ion and the present inventors have discover that it can be used advantageously in the Fenton reaction-based process.

$$Fe^{III}\text{-}L + H_2O_2 \rightarrow Fe^{III}\text{-}L + OH^- + \cdot OH \qquad (7)$$

The data published in the literature show that iron(II)-chelate reacts very fast with hydrogen peroxide and the second-order rate constant for the reaction of $H_2O_2$ with iron(II)-chelates is greater than $10^3$ $M^{-1}s^{-1}$ (Borregard et al. (Borregard, O. K., Farver, O., and Andersen V. (1971). Polarographic study of the rate of reaction of Iron(II) chelates and hydrogen peroxide, *Acta Chemica Scandinavia* 25, 3541-3543)); Rahal and Richter, ibid; De Laat et al., 2011, ibid). The OH-radical generated in the above reaction can react with organic compounds and initiate a cascade of reactions that can ultimately lead to transformation of harmful chemicals into harmless products. The oxidation of sulfide to elemental sulfur by iron(III)-chelate is very fast (Wubs et al., Wubs, H. J., and Beenakers, A. A. C. M. (1994). Kinetics of H2S absorption into aqueous ferric solutions of EDTA and HEDTA, *AICHE J.* 40, 433-444)) and as a result, the inventors have formed a reasonable expectation that the oxidation of organic contaminants in fluids such as water with $S^{2-}/Fe^{III}\text{-}L/H_2O_2$ will very fast and nearly instantaneous.

The present inventors have discovered that oxidation of sulfide by iron(III)-chelate generates Iron(II)-chelate and that the ferrous iron generated in this process in combination with hydrogen peroxide can be used to oxidize and destroy organic pollutants in contaminated water. Thus, the terms "iron(III)-chelate" or "complex of iron(III) and a chelating agent" include any $Fe^{III}\text{-}L$ that can react with, and oxidize sulfide ion to elemental sulfur and generate ferrous ion at the same time.

In a particularly preferred aspect of the present invention, the process is used for reducing concentration of organic contaminants in an OGR effluent that is also contaminated with sour gas. In another of its preferred aspects, the present process may be used for oxidation of organic contaminants in industrial effluents employing sulfide ion, $Fe^{III}\text{-}L$ and hydrogen peroxide. In yet another of its preferred aspects, the process is very fast with a short hydraulic residence time and can be implemented for a continuous process without the need for reaction or holding tank.

Embodiments of the present invention will now be actually demonstrated with reference to the following examples which are provided for illustrative purposes only and should not be used to limit or construe the invention.

Example 1

This example illustrates catalytic decomposition of hydrogen peroxide in Milli-Q water In this test approximately 100 mL of borate buffered solution (pH 8.0)-0.05 M boric acid, 0.1 M KCl—spiked with about 60 mg/L of hydrogen peroxide was added to a 250 mL Erlenmeyer flask. An initial sample was taken and 0.2 mM of Fe(III)-NTA to the solution while it was being mixed using a magnetic stirrer bar. Samples were taken at regular time intervals and analyzed for hydrogen peroxide. The same test was repeated again but the solution after taking an initial sample was spiked with about 30 mg/L of sulfide and 0.2 mM Fe(III)-NTA. Again samples were taken at regular time intervals and analyzed for hydrogen peroxide.

The test results presented in FIG. 1 show that the decay rate of hydrogen peroxide catalyzed by Fe(III)-NTA is monophasic and similar to those reported in the literature (De Laat et al., 2011); however, the decay kinetics in the presence sulfide ion becomes biphasic and is similar to the decomposition of $H_2O_2$ catalyzed by Fe(II)-NTA (De Laat et al., 2011). The data show a very fast decomposition of $H_2O_2$ followed by a second and much slower one. The initial fast decay of $H_2O_2$ is catalyzed by Fe(II)-NTA which is generated from oxidation of sulfide ion by Fe(III)-NTA. The slow decomposition of $H_2O_2$ is due to catalytic decomposition of $H_2O_2$ by Fe(III)-NTA.

Example 2

This example illustrates oxidation of benzene in Milli-Q water. Two sets of tests were performed to demonstrate that oxidation of benzene by a preferred embodiment of the present is instantaneous.

In the first test, an Erlenmeyer flask was filled with approximately 200 mL of a solution containing about 60 mg/L of sulfide ion and 20 mg/L of benzene. An initial sample was taken followed by addition of 0.6 mM of Fe(III)-NTA, adjusted solution pH to about 7.0 and a second sample was taken. The remaining solution was then treated by stepwise addition of hydrogen peroxide. Approximately, 15 mg/L of $H_2O_2$ was added at each step and a sample was taken less than 0.5 min after peroxide addition. Hydrogen peroxide added in each step was consumed instantaneously except for the last two steps in which hydrogen peroxide were not consumed instantaneously. The samples were filtered to remove suspended solids and analyzed for benzene, phenol and Fe(II) and total iron. The results are presented in FIGS. 2 and 3.

The iron speciation results (see FIG. 3) demonstrate that Fe(III) is reduced to Fe(II) almost quantitatively. The data also show that Fe(II) concentration decreases with stepwise peroxide addition, which is due to oxidation of and removal of sulfide.

Figure 2:
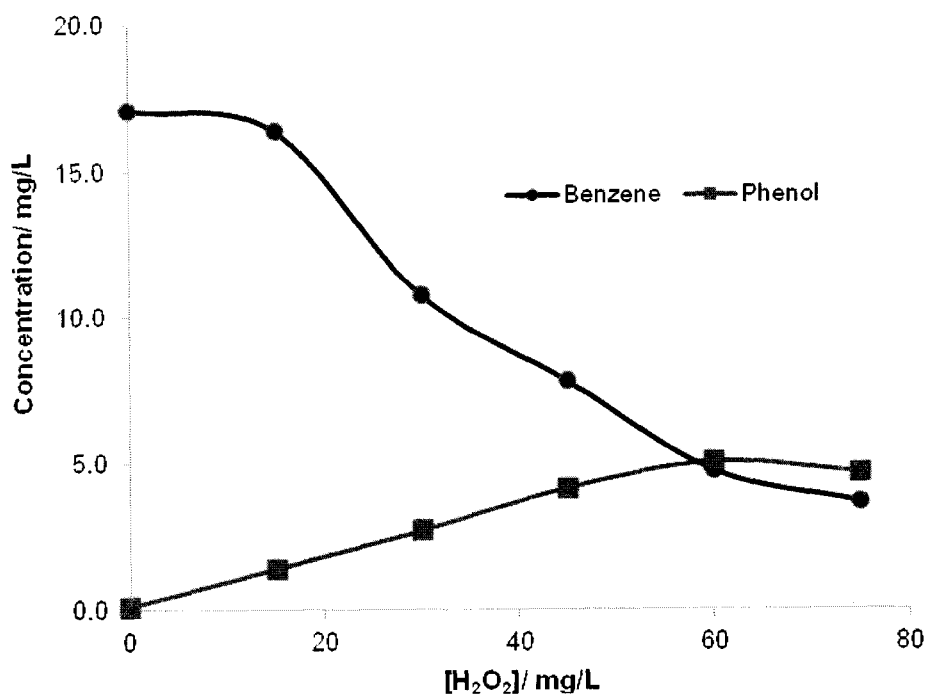
FIG. 2 illustrates oxidation benzene and formation of phenol in Milli-Q water with $S^{2-}$/Fe(III)-NTA/$H_2O_2$ as a function of hydrogen peroxide.
Figure 3:
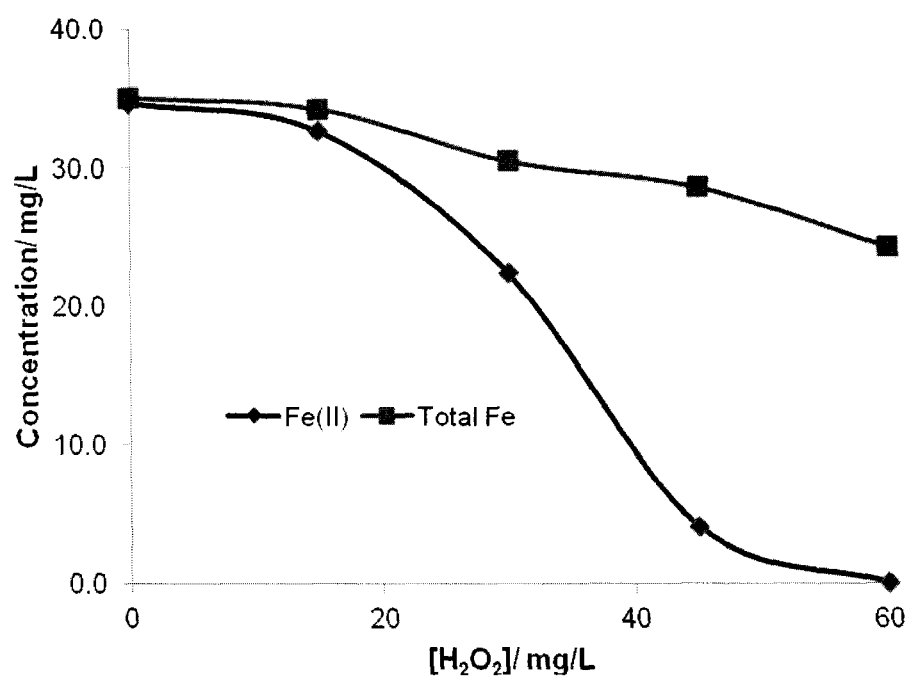
FIG. 3 illustrates iron speciation during oxidation of benzene with $S^{2-}$/Fe(III)-NTA/$H_2O_2$.

The data presented in FIG. 2 shows that oxidation of benzene generates phenol, demonstrating the involvement of hydroxyl radicals. The fraction of benzene removed after addition of the first 15 mg/L of $H_2O_2$ was low and this is because of the presence of sulfide ion in solution which reacts very fast with OH-radical and competes effectively with benzene for OH-radical. The test results also show that oxidation of benzene by $Fe^{II}$-NTA prior to addition of hydrogen peroxide is negligible; perhaps indicating that oxidation of $Fe^{II}$-NTA by dissolved oxygen to generate $H_2O_2$ is slow under the applied experimental conditions.

In the second series of tests, an Erlenmeyer flask was filled with approximately 200 mL of a solution containing about 60 mg/L of sulfide ion and 20 mg/L of benzene. A sample was taken and to the remaining solution was added a known concentration of Fe(III)-NTA, its pH was adjusted to about 7.0, and another sample was taken. The solution was then treated with about 70 mg/L of hydrogen peroxide. Samples were taken at 1.0 and 5.0 minutes after peroxide addition. The samples collected were analyzed for benzene and phenol and the results are presented in Table 1.

The concentration of benzene prior to addition of Fe(III)-NTA was about 20-22 mg/L; the slight decrease after addition of Fe(III)-NTA was mostly due to dilution. The data presented in Table 2 clearly show that:
  benzene concentration was reduced by about four fold shortly after addition of hydrogen peroxide;
  the fraction of benzene removed in all but one case appears to be independent of concentration of Fe(III)-NTA under the experimental conditions;
  oxidation of benzene generates phenol;
  the majority of hydrogen peroxide was consumed instantaneously and a small amount, usually, less than 10 mg/L, remained in solution after about a minutes; and
  the concentration of $H_2O_2$ consumed instantaneously is approximately equal to that of sulfide ion.

Example 3

This example illustrates oxidation of benzene and toluene with other iron-catalysts.

The data presented in this example shows that the iron catalyst employed by present process is not limited to Fe-NTA and that Fe-NTA can be replaced by other iron catalysts, such as Fe-ethylenediamine tetracateic acid (Fe-EDTA)], Fe-Diethylenetriamine pentacaetic acid (Fe-DTPA), Fe-Phosphonmethyliminodiacetic acid (PDA), Fe—[N-(2-carboxyethyl)iminodiacetic acid] (CEDA), etc.

The tests described in the previous examples were repeated employing the replacement catalysts and the test results are presented in Tables 2-5. The data presented in these tables show that all of the above substitute catalysts are as effective Fe-NTA insofar as the concentration of benzene removed appears to be independent of specific iron-catalyst used and increases with increasing concentration of the catalyst.

As described above, the present process can also be used for the oxidation of and removal of other contaminants, such as toluene, ethylbenzene, other aromatic hydrocarbons, chlorinated alkenes, etc. The experimental data for the oxidation of toluene in tap water with Fe-CEDA/$HS^-$/$H_2O_2$ and Fe-ETDA/$HS^-$/$H_2O_2$ are presented in Tables 5 and 6. The data clearly demonstrate that oxidation of toluene with the present process is as efficient as it was for the oxidation of benzene.

Example 4

This example illustrates oxidation of benzene in an oil and gas refinery wastewater These tests were conducted in the field treating an oil and gas refinery (OGR) wastewater contaminated with approximately 20 mg/L of sulfide ion and 19 mg/L of benzene. The water temperature was about 40° C. Approximately 900 mL of wastewater was added to a 1 L Erlenmyer flask, mixed with magnetic stirrer, and spiked with about 30 mg/L of hydrogen peroxide and three different concentrations—0.18 mM, 0.27 mM, and 0.35 mM—of Fe(III)-NTA. Samples were taken five minutes after addition of catalyst and hydrogen peroxide—at which point all added hydrogen peroxide was consumed—and were sent to an independent analytical laboratory for determination of benzene concentration.

The test results are presented in Table 7. As in the case of laboratory testing, hydrogen peroxide was consumed quickly after addition of Fe(III)-NTA and benzene concentration was reduced to ≤4.1 mg/L. The test results also show that the treatment goal can be achieved employing modest concentration of hydrogen peroxide and Fe(III)-NTA.

Example 5

A refinery wastewater contaminated with emulsified O&G, sulfide, mercaptans, etc. was treated with the present process making use of indigenous sulfide to primarily remove oil and gas.

Approximately 950 mL of the wastewater was added to a beaker, spiked with 0.5-1 mM Fe-NTA or Fe(III) and appropriate amount of hydrogen peroxide and mixed with a magnetic stirring bar. Treated water—following consumption of hydrogen peroxide—was flocculated to remove elemental sulfur—generated from the oxidation of sulphide—employing Chemtreat's P893L and P816E flocculants. The filtered water was sent to an independent analytical laboratory for determination of O&G following standard procedures (Rice, E. W., Baird, R. B., Eaton, A. D. and Clesceri, L. S., ED (2012). Standard methods for examination of water and wastewater, American water work association, Washington, USA). The results are presented in Table 8 and clearly show that the process was able to remove emulsified O&G and reduce its concentration from about 60 mg/L to below 7 mg/L.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

Oxidation of benzene in Milli-Q water by Fe(III)-NTA/HS$^-$/H$_2$O$_2$;
[S$^{2-}$] = 60 mg/L, [H$_2$O$_2$] = 70 mg/L; pH = 7.0 ± 0.1

| [Fe-NTA]/mM | Initial After Fe(III)-NTA addition | | After H$_2$O$_2$ Addition | | | |
|---|---|---|---|---|---|---|
| | | | 1 min. | | 5 min. | |
| | Benzene | Phenol | Benzene | Phenol | Benzene | Phenol |
| 0.2 | 18.2 | ND | 8.6 | 4.9 | 6.9 | 5.3 |
| 0.4 | 18.2 | ND | 5.8 | 5.2 | 5.4 | 4.9 |
| 0.6 | 19.2 | ND | 4.6 | 4.5 | 4.4 | 4.3 |
| 0.8 | 19.0 | ND | 4.1 | 3.8 | 3.3 | 3.6 |

TABLE 2

Oxidation of benzene in Milli-Q water by Fe(III)-PDA/HS$^-$/H$_2$O$_2$;
[S$^{2-}$] = 60 mg/L, [H$_2$O$_2$] = 70 mg/L; pH = 7.0 ± 0.1

| [Fe-PDA]/mM | Initial After Fe(III)-PDA addition | | After H$_2$O$_2$ Addition | | | |
|---|---|---|---|---|---|---|
| | | | 1 min. | | 5 min. | |
| | Benzene | Phenol | Benzene | Phenol | Benzene | Phenol |
| 0.2 | 16.9 | ND | 8.6 | 4.3 | 6.1 | 6.3 |
| 0.4 | 18.9 | ND | 6.3 | 5.7 | 4.0 | 5.8 |
| 0.6 | 18.7 | ND | 3.8 | 5.6 | 3.0 | 5.7 |
| 0.8 | 19.8 | ND | 3.2 | 5.9 | 2.0 | 5.3 |

TABLE 3

Oxidation of benzene in tap water by Fe(III)-CEDA/HS$^-$/H$_2$O$_2$;
[S$^{2-}$] = 30 mg/L, [H$_2$O$_2$] = 70 mg/L; pH = 7.0 ± 0.1

| [Fe-CEDA]/mM | Initial After Fe(III)-CEDA addition | | After H$_2$O$_2$ Addition | | | |
|---|---|---|---|---|---|---|
| | | | 1 min. | | 5 min. | |
| | Benzene | Phenol | Benzene | Phenol | Benzene | Phenol |
| 0.4 | 13.9 | ND | 3.2 | 9.1 | 2.6 | 9.7 |
| 0.3 | 15.1 | ND | 3.9 | 3 | 3.1 | 2.8 |
| 0.2 | 14.8 | ND | 4.4 | 3.8 | 3.9 | 3.7 |
| 0.1 | 15.3 | ND | 5.3 | 3.8 | 4.9 | 3.9 |

TABLE 4

Oxidation of benzene in tap water by Fe(III)-EDTA/HS$^-$/H$_2$O$_2$;
[S$^{2-}$] = 40 mg/L, [H$_2$O$_2$] = 60 mg/L; pH = 7.0 ± 0.1

| [Fe-EDTA]/mM | [Benzene]/mg/L | | |
|---|---|---|---|
| | Initial | 1 min. | 5 min. |
| 0.8 | 24.0 | 6.0 | 5.5 |
| 0.6 | 22.0 | 4.0 | 3.0 |

TABLE 5

Oxidation of toluene in tap water by Fe(III)-CEDA/HS$^-$/H$_2$O$_2$;
[S$^{2-}$] = 30 mg/L, [H$_2$O$_2$] = 70 mg/L; pH = 7.0 ± 0.1

| [Fe-CEDA]/mM | Initial After Fe(III)-CEDA addition | | After H$_2$O$_2$ Addition | |
|---|---|---|---|---|
| | | | 1 min. | 5 min. |
| | Benzene | Phenol | Benzene | Benzene |
| 0.4 | 16.3 | ND | 3.7 | 2.2 |
| 0.3 | 17.1 | ND | 4.5 | 3.6 |
| 0.3 | 17.8 | ND | 5.4 | 4.1 |
| 0.1 | 17.1 | ND | 6.9 | 5.1 |

TABLE 6

Oxidation of toluene in tap water by Fe(III)-EDTA/HS⁻/H₂O₂; at different pH and sulfide concentration; [Fe-EDTA] = 0.6 mM, H₂O₂] = 60 mg/L

| pH | [HS⁻]/mg/L | Toluene/mg/L Initial | Toluene/mg/L Final | pH | [HS⁻]/mg/L | Toluene/mg/L |
|---|---|---|---|---|---|---|
| 7 | 50 | 22 | 2.4 | 7 | 40 | 25 | 3.4 |
| 8 | 50 | 20 | 2.6 | 8 | 40 | 24 | 3.8 |
| 9 | 50 | 22 | 4.3 | 9 | 40 | 25 | 4.7 |

TABLE 7

Oxidation of benzene in an OGR wastewater by the modified Fenton process; [H₂O₂] = 30 mg/L, Temperature ≅ 40° C., [S²⁻] = 20 mg/L

| Parameters | Initial | 0.18 mM Fe(III)-NTA | 0.27 mM Fe(III)-NTA | 0.35 mM Fe(III)-NTA |
|---|---|---|---|---|
| pH | 7.3 | 7.3 | 7.2 | 7.2 |
| Benzene/mg/L | 18.7 | 4.1 | 3 | 3 |
| Sulfide/mg/L | 20 | 0 | 0 | 0 |

TABLE 7

Experimental for the removal of O&G from refinery wastewater

| Treatment Process | [Reagent]/ mM | [H₂O₂]/ mg/L | [P893L]¹/ [P816E]/ mg/L | pH | O&G/ mg/L |
|---|---|---|---|---|---|
| None | NA | None | None | As received | 63 |
| Fe(III)/H₂O₂ | 0.5 | 540 | 125/30 | As received | 5.5 |
| Fe(III)/H₂O₂ | 1.0 | 470 | 105/20 | As received | 6.8 |
| Fe(III)NTA/ H₂O₂ | 0.5 | 430 | 105/30 | As received | 4.2 |
| Fe(III)-NTA/ H₂O₂ | 0.5 | 470 | 105/20 | As received | 3.8 |

¹The calculation of concentration of P893L is based on the assumption that the concentrated solution received from Chemtreat is 100% pure.

What is claimed is:

1. A process for treatment of a fluid comprising water, an oxidizable contaminant, and a sulfide, the process comprising the steps of:
   (a) adding a complex of Fe(III) and a chelating agent to the fluid to cause the complex of Fe(III) and the chelating agent to react with the sulfide to produce a complex of Fe(II) and the chelating agent;
   (b) adding hydrogen peroxide to the fluid to cause the hydrogen peroxide to react with the complex of Fe(II) and the chelating agent to produce a hydroxyl radical; and
   (c) causing the hydroxyl radical to react with the oxidizable contaminant to reduce the concentration of the oxidizable contaminant in the fluid.

2. The process defined in claim 1, wherein Step (a) is conducted at a pH in the range of from about 6.5 to about 10.

3. The process defined in claim 1, wherein the chelating agent is selected from the group consisting of nitrilotriacetic acid (NTA), ethylenediamine-N,N'-tetraacetic acid (EDTA), diethylenetriaminepentacetic acid (DTPA), ethylenediamine-N,N'-disuccinic acid (EDDS), iminodisuccinic acid (IDS), methylglycinediacetic (MGA), phosphonomethylimi-nodiacetic acid (PDA) and N-(2-carboxyethyl) iminodiacetic acid (CEDA).

4. The process defined in claim 1, wherein the oxidizable contaminant is selected from the group consisting of gasoline, MtBE, EtBE, BTEX (benzene-toluene-ethylbenzene-xy-lenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cisdichloroethene, trans-dichloroethene, hydrazine, diaminotoluene, phenol, NDMA, haloalkenes, acetones, ketones, cyanides, acrylonitriles, phenols, formaldehyde, alcohols, glycol ethers, chlorinated solvents, chemical warfare agents, ordnance, propellants, energetic compounds, a pharmaceutical, a pesticide, a plasticizer, a chelant, a fire retardant, a disinfectant, a detergent metabolite, a chloroethene, a petroleum hydrocarbons, a compound that contributes to biological oxygen demand, a compound that contributes to chemical oxygen demand, a polyfunctional oxygenated compound, an aliphatic alcohol, an ether, a ketone, an alkane, a naphthalene, a lubricant, a cyanide, a mercaptan and any mixture of two or more of these.

5. The process defined in claim 1, wherein the oxidizable contaminant is selected from the group consisting of a pest, a plant, an invertebrate, a mollusk, a nematode, an insect, a parasite, a mold, a fungi, a protozoa, an amoeba, a bacteria, a virus, a prion, a protein, an amino acid, smallpox, Ebola, cholera, typhoid, anthrax, plague, *cryptosporidium* and any mixture of two or more of these.

6. The process defined in claim 1, wherein the fluid is selected from the group consisting of groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, spent ultra-pure water and any mixture of two or more of these.

7. The process defined in claim 1, wherein the sulfide is dissolved sulfide (HS—).

8. The process defined in claim 1, wherein the hydrogen peroxide is present at a concentration in the range of about 1 mM to about 5 mM.

9. The process defined in claim 1, wherein the complex of Fe(III) and the chelating agent is present at a concentration in the range of about 0.1 mM to about 2 mM.

10. The process defined in claim 1, wherein Step (a) is conducted for a period of from about 1 to about 15 minutes.

11. A process for treatment of a wastewater comprising an oxidizable contaminant and a sulfide, the process comprising the steps of:
   (a) adding a complex of Fe(III) with a chelating agent to the wastewater to cause the complex of Fe(III) with the chelating agent to react with the sulfide to produce a complex of Fe(II) and the chelating agent;
   (b) adding hydrogen peroxide to the wastewater to cause the hydrogen peroxide to react with the complex of Fe(II) with the chelating agent to produce a hydroxyl radical; and
   (c) causing the hydroxyl radical to react with the oxidizable contaminant to reduce the concentration of the oxidizable contaminant in the wastewater.

12. The process defined in claim 11, wherein Step (a) is conducted at a pH in the range of from about 6.5 to about 10.

13. The process defined in claim 11, wherein the chelating agent is selected from the group consisting of nitrilotriacetic acid (NTA), ethylenediamine-N,N'-tetraacetic acid (EDTA), diethylenetriaminepentacetic acid (DTPA), ethylenediamine-N,N'-disuccinic acid (EDDS), iminodisuccinic acid (IDS), methylglycinediacetic (MGA), phosphonomethylimi-nodiacetic acid (PDA) and N-(2-carboxyethyl) iminodiacetic acid (CEDA).

14. The process defined in claim 11, wherein the oxidizable contaminant is selected from the group consisting of gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cisdichloroethene, trans-dichloroethene, hydrazine, diaminotoluene; phenol; NDMA, haloalkenes acetones, ketones, cyanides, acrylonitriles, phenols, formaldehyde, alcohols, glycol ethers, chlorinated solvents chemical warfare agents, ordnance, propellants, energetic compounds, a pharmaceutical, a pesticide, a plasticizer, a chelant, a fire retardant, a disinfectant, a detergent metabolite, a chloroethene, a petroleum hydrocarbons, a compound that contributes to biological oxygen demand, a compound that contributes to chemical oxygen demand, a polyfunctional oxygenated compound, an aliphatic alcohol, an ether, a ketone, an alkane, a naphthalene, a lubricant, a cyanide, a mercaptan and any mixture of two or more of these.

15. The process defined in claim 11, wherein the oxidizable contaminant is selected from the group consisting of a pest, a plant, an invertebrate, a mollusk, a nematode, an insect, a parasite, a mold, a fungi, a protozoa, an amoeba, a bacteria, a virus, a prion, a protein, an amino acid, smallpox, Ebola, cholera, typhoid, anthrax, plague, *cryptosporidium* and any mixture of two or more of these.

16. The process defined in claim 11, wherein the sulfide is dissolved sulfide (HS—).

17. A process for treatment of a petroleum refinery waste-water comprising an oxidizable contaminant and a sulfide, the process comprising the steps of:
    (a) adding a complex of Fe(III) and a chelating agent to the wastewater to cause the complex of Fe(III) and the chelating agent to react with the sulfide to produce a complex of Fe(II) and the chelating agent;
    (b) adding hydrogen peroxide to the wastewater to cause the hydrogen peroxide to react with the complex of Fe(II) and the chelating agent to produce a hydroxyl radical; and
    (c) causing the hydroxyl radical to react with the oxidizable contaminant to reduce the concentration of the oxidizable contaminant in the wastewater.

18. The process defined in claim 17, wherein the chelating agent is selected from the group consisting of nitrilotriacetic acid (NTA), ethylenediamine-N,N'-tetraacetic acid (EDTA), diethylenetriaminepentacetic acid (DTPA), ethylenediamine-N,N'-disuccinic acid (EDDS), iminosuccinic acid (IDS), methylglycinediacetic (MGA), phosphonomethylimi-nodiacetic acid (PDA) and N-(2-carboxyethyl) iminodiacetic acid (CEDA).

19. The process defined in claim 17, wherein the oxidizable contaminant is selected from the group consisting of gasoline, MtBE, EtBE, BTEX (benzene-toluene-ethylbenzene-xy-lenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cisdichloroethene, trans-dichloroethene, hydrazine, diaminotoluene; phenol; NDMA, haloalkenes acetones, ketones, cyanides, acrylonitriles, phenols, formaldehyde, alcohols, glycol ethers, chlorinated solvents chemical warfare agents, ordnance, propellants, energetic compounds, a pharmaceutical, a pesticide, a plasticizer, a chelant, a fire retardant, a disinfectant, a detergent metabolite, a chloroethene, a petroleum hydrocarbons, a compound that contributes to biological oxygen demand, a compound that contributes to chemical oxygen demand, a polyfunctional oxygenated compound, an aliphatic alcohol, an ether, a ketone, an alkane, a naphthalene, a lubricant, a cyanide, a mercaptan and any mixture of two or more of these.

20. The process defined in claim 17, wherein the sulfide is selected from the group consisting of dissolved sulfide (HS—), methylsulfide, a mercaptan and any mixture of two or more of these.

* * * * *